United States Patent
Berger

(10) Patent No.: US 12,491,811 B2
(45) Date of Patent: Dec. 9, 2025

(54) NOISE ATTENUATING TRIM PART FOR A VEHICLE

(71) Applicant: AUTONEUM MANAGEMENT AG, Winterthur (CH)

(72) Inventor: Yann Berger, Aadorf (CH)

(73) Assignee: AUTONEUM MANAGEMENT AG, Winterthur (CH)

( * ) Notice: Subject to any disclaimer, the term of this patent is extended or adjusted under 35 U.S.C. 154(b) by 774 days.

(21) Appl. No.: 17/755,021

(22) PCT Filed: Oct. 22, 2020

(86) PCT No.: PCT/EP2020/079686
§ 371 (c)(1),
(2) Date: Apr. 19, 2022

(87) PCT Pub. No.: WO2021/078828
PCT Pub. Date: Apr. 29, 2021

(65) Prior Publication Data
US 2022/0388436 A1 Dec. 8, 2022

(30) Foreign Application Priority Data
Oct. 25, 2019 (EP) .................................. 19205335

(51) Int. Cl.
*B60N 3/04* (2006.01)
*D06N 7/00* (2006.01)

(52) U.S. Cl.
CPC .......... *B60N 3/048* (2013.01); *D06N 7/0065* (2013.01); *D06N 7/0076* (2013.01);
(Continued)

(58) Field of Classification Search
CPC .... B06N 3/048; D06N 7/0065; D06N 7/0076; D06N 2209/025; B32B 27/20;
(Continued)

(56) References Cited

U.S. PATENT DOCUMENTS

2009/0090832 A1   4/2009  Mileos et al.
2017/0081508 A1*  3/2017  Daniere ................... B32B 27/12

FOREIGN PATENT DOCUMENTS

EP    2918635 A1   9/2015
EP    3324403 A1   5/2018
EP    3456777 A1   3/2019

OTHER PUBLICATIONS

International Search Report associated with parent PCT/EP2020/079686. Apr. 29, 2021. 4 pages.
(Continued)

*Primary Examiner* — Jenna N Chandhok
(74) *Attorney, Agent, or Firm* — FisherBroyles, LLP; Craig W. Mueller

(57) ABSTRACT

Noise attenuating trim part for a vehicle comprising a pile layer, a bonding mass layer and a backing layer whereby the bonding mass layer is bonded to the adjacent layers whereby the bonding mass layer is comprising at least thermoplastic elastomeric polyolefin based compound material (TPO) with a filler content of at least 55%, and whereby the bonding mass layer has a density of between 1.4 and 1.75 kg/dm³, a viscosity of less than 50.000 mPa·s and a MFI above 250 and whereby the bonding mass layer is adjacent the pile layer and partly penetrated into the lower area of the pile thereby binding the fibers and/or filaments and/or the tufts within the pile.

14 Claims, 2 Drawing Sheets

(52) U.S. Cl.
CPC ... *D06N 2203/042* (2013.01); *D06N 2203/06* (2013.01); *D06N 2209/025* (2013.01); *D06N 2211/261* (2013.01)

(58) Field of Classification Search
CPC .......... B32B 2270/00; B32B 2307/102; B32B 2307/56; B32B 2471/00; B32B 2605/003; B32B 2605/08; B60R 13/80; G10K 11/168
See application file for complete search history.

(56) References Cited

OTHER PUBLICATIONS

Written Opinion associated with parent PCT/EP2020/079686. Apr. 29, 2021. 7 pages.

* cited by examiner

NOISE ATTENUATING TRIM PART FOR A VEHICLE

This application is a national stage application under 35 U.S.C. 371 and claims the benefit of PCT Application No. PCT/EP2020/079686 having an international filing date of Oct. 22, 2020, which designated the United States, and which claims the benefit of European Patent Application No. EP19205335.3, filed Oct. 25, 2019, the disclosure of each of which are incorporated by reference herein.

TECHNICAL FIELD

The invention is directed to a Noise attenuating trim part for a vehicle and the use of such a trim part.

BACKGROUND ART

In the automotive industry there is a need for highly filled materials that can introduce weight in a part without increasing substantially the thickness of the part, as for most parts there is only a restricted space available for acoustic treatment of the car. Most of the time not more than up to 30 mm may be available for the actual treatment.

In particular, for inner dash and flooring parts an acoustic function is required by the car makers. This can be an air pervious solution to increase noise absorption, and/or an insulating solution in the form of a combination of an acoustic mass layer combined with a decoupling layer to form a mass spring system. The absorbing solution is normally used to attenuate air borne noise while the insulating solution is used for attenuating vibrational noise. Hybrid solution combining the two may be used as well.

It is known to use heavily filled thermoplastic elastomeric layers in automotive trim part. These layers may be based on thermoplastic elastomers, like EP-Diene rubber (EPDM) or styrene ethylene butadiene styrene (SBS) as matrix and filled with inert particles with up to 90%. Examples of such elastomeric layers can be found in for instance WO 2015/135815 disclosing a barrier layer based on an ethylene polymer mixture preferably containing LLDPE or LDPE and with filler content of between 35% and 90%. From a filling grade above 50% the material's viscosity increases, like a thick dough, and becomes difficult to process, requiring heavy equipment.

Current processes proposed for these types of materials are a combination of extrusion with calendaring or compression molding. For instance, blanks or sheets may be produced through calendaring. The sheets are cut into shape and or size and formed using a vacuum forming process into the final shape eventually together with additional layers, like the decoupling layer. The process comprises multiple steps and it is difficult to achieve variable thickness.

A combined process of injecting and compressing is needed to fill the full cavity for a molded layer solution which may include remote areas and smaller details. In these processes the material may be pushed during cooling, increasing the risk of streaking and pairing half solidified areas. These areas may by prone to cracking or breaking during the molding step of the final part as well as during the use of the part in the car. The mold may be open during filling to reduce the pressure and tonnage required for pushing and closed later in the process, to increase the pressure pushing the material to the corner of the form.

In the 1980's it was known to use an EVA based hot melt with a low viscosity and high filler grade up to 80%. During production this material was easy to process, requiring less heavy machinery. However, the low melting temperature, above 90° C. it becomes liquid, makes it impossible to use the material in a car as the low temperature poses the risk of delamination of parts during use, in particularly close to hot sources the tunnel area above the exhaust pipe and/or in hot summers with the car standing in full sunlight.

Due to increased noise requirements from the car makers directed to the reduction of exterior noise in the passenger compartment, there is a need to increase weight in the parts without increasing the thickness of the parts. However, this cannot be achieved economically with the current material and process solutions.

It is the object of the invention to provide for bonding mass layer material enabling easier process conditions, decreasing the cost of production and the wear of the machines. However, maintaining the requirements of the product, when used as a backing layer and or barrier in a spring mass acoustic system for an automotive trim part.

SUMMARY OF INVENTION

The object is achieved by the noise attenuating trim part for a vehicle with at least a pile layer, a backing layer and a bonding mass layer according to main claim 1 and the use of such a trim part.

In particularly by a bonding mass layer that is able to bond to the adjacent layer, comprising at least a thermoplastic elastomeric polyolefin based compound material (TPO) with a filler content of at least 55%, and having a density of between 1.4 and 1.75 kg/dm3, a viscosity of less than 50,000 mPa·s and a MFI above 250 and whereby the bonding mass layer is adjacent the pile layer and partly penetrated into the lower area of the pile thereby binding the fibers and/or filaments and/or the tufts within the pile.

Furthermore, by using a TPO based compound material with the given features of claim 1 it is possible to use the heavy filled material as a weight increasing layer as well as a binder layer between the pile surface layer and the adjacent backing layer. Surprisingly, the bonding mass layer is not only ably to adhere to the surface of the pile layer but is also able to penetrate into the pile layer, hence it is able to function as a fiber and or tuft lock for the pile layer. Therefore, a traditional used tuft lock or fiber lock layer like for instance latex is no longer needed for a good tuft or fiber locking, further optimizing the production process steps necessary.

The melt flow index (MFI) is measured according to ISO 1133-1 from 2012 at 190° C. While the viscosity is measured according to ISO11443 of 1995 at 190° C.

The bonding mass layer may further comprise at least one fatty acid and optional additives, whereby the inert filler is between 55 and 70% by weight of the overall bonding mass layer, and the fatty acid content is between 0.2 and 0.8% by weight of the overall bonding mass layer. Surprisingly, fatty acid enables the increase of the filler content within the bonding mass layer while preventing the material from becoming crumbly and prone to cracking. The amount of fatty acid can be tuned depending on the final filler amount, hence the density of the bonding mass layer needed.

The fatty acid may comprise at least fatty acids with an aliphatic chain of at least 14, preferably with an aliphatic chain of 16 and/or 18.

The bonding mass layer according to the invention comprises of a TPO compound material, filler, at least one fatty acid and optionally further additives.

The TPO for the compound material consists of a first component consisting of at least one of a partially amorphous polyolefin, preferably an amorphous poly-alpha-olefin APAO; and a second component consisting of a PP Ethylene with a random ethylene repeat distribution having a specific density of less than 0.87 kg/dm3.

Preferably, the first component is at least 3% by weight of the overall bonding barrier layer and the second component is at least 7% by weight of the overall bonding barrier layer.

However, the first and second components together are preferably between 10-48% by weight of the overall bonding barrier layer.

The noise attenuating trim part may have a bonding barrier layer with a constant or locally variable area weight over the surface of the part. Preferably the bonding mass layer has an area weight of between 100 and 980 g/m2.

Surprisingly, it was found that the porosity of the bonding mass layer may be tuned. Under 400 g/m2 the layer will always be pervious and above 600 g/m2 the layer will always be impervious. However, at an area weight between roughly 400 and 600 g/m2 the porosity can be adjusted to be pervious or impervious by adapting the machine parameters during application. If the layer is pervious it can work as an air flow resistant layer within the part, meaning that the noise can go through the layer and reach a possible noise absorbing layer in the form of an open cell foam or porous fibrous layer underneath.

The pile layer might be a needle punch or tufted carpet layer and may have an area weight of between 200 to 800 g/m2.

For instance, the pile layer may be a tufted carpet layer consisting of BCF yarn tufted into a primary backing layer.

The pile layer may also be a needle punch carpet layer with a densified sole area and a surface area formed of looped fibers standing substantially perpendicular to the surface comprising fibers preferably of a least one of solid fibers, hollow fibers, binder fibers or bicomponent fibers.

Noise attenuating trim part according to one of the preceding claims where the pile layer fibers and/or filaments and/or yarn is made of at least one polymer or co-polymer from the group of polyester, preferably polyethylene terephthalate (PET), or polyamides, preferably polyamide-6 (PA6) or polyamide-66 (PA66), or polyolefins preferably polypropylene (PP), or polyethylene (PE), or mixtures from 2 or more of these polymers and or co-polymers. The fibers, filaments and/or yarns may be based on bio-resourced, reclaimed or recycled materials, or may include such type of sourced materials.

The noise attenuating trim part in its basic configuration comprises a pile layer, a bonding mass layer according to the invention and a backing layer whereby the bonding mass layer is bonded to the adjacent layers and whereby the bonding mass layer is at least adjacent the pile layer and partly penetrated into the lower area of the pile thereby binding the fibers and/or filaments and/or the tufts within the pile.

The backing layer may be at least one of a fibrous layer, preferably one of a shoddy, recycled or reclaimed fibrous web, or a foam layer, preferably a slab foam or in mold reactive foam layer, preferably a polyurethane foam. Preferably the foam layer is an open cell foam, preferably without a skin or with a porous skin.

In case the area weight of the bonding mass layer is less than 800 g/m2 and therefore porous, the overall part functions as an absorbing carpet layer and may be used as flooring or inner dash but also might be used as a cladding in the storage area in the front—frunk—or in the rear—trunk—of the car. Surprisingly, the extra filler content of the bonding mass layer enables a stiffer part, hence the layer is less prone to buckling or gliding. Furthermore, the basic layout already shows a good abrasion performance comparable to a normal standard part with a latex secondary backing.

In another preferred embodiment the noise attenuating trim part in addition to the basic configuration of a pile layer, a bonding mass layer according to the invention and a backing layer further comprises, an additional layer preferably one of a high density thermoplastic elastomeric layer, a film layer, or an air flow resistive fibrous layer with an air flow resistance of at least 1000 Rayls.

The additional layer or layers may be placed only locally in the form of a patch or as a full layer.

For instance, a part with a pile layer, the bonding mass layer and an additional high filled thermoplastic layer or patch, and a backing layer, will behave as an acoustic mass spring system. The part will be mainly insulating noise, whereby the area weight of the bonding mass layer might be increased to further optimize the mass effect of the additional layer.

In another tuned configuration the bonding mass layer may be used near to its maximum weight and function as a thin mass layer in a noise insulating trim part. Patches of thermoplastic material may be used to further increase the weight in local vibrational hot spots. This enables the tuning of the part, placing only more weight in those areas that need additional noise attenuation, while overall the part functions as a light noise insulating part.

Preferably the high density thermoplastic elastomeric layer or patch is impervious and has area weight between 800 and 2000 g/m2.

The high density thermoplastic elastomeric layer or patch might be made by the same or a similar material as the bonding mass layer, for instance by applying a second layer or local patches on the back of the bonding mass layer or by combining 2 bonding mass layers during molding.

Alternatively, the high density thermoplastic layer may be made of classical mass or heavy layer material like EPDM, LDPE or other filled thermoplastic materials.

Preferably the noise attenuating trim part is molded into a 3D shape fitting in the shape needed to fit the dedicated space in the vehicle.

Use of the noise attenuating trim part according to the invention as an automotive flooring, inner dash, outer dash, acoustic trim panel or trunk of frunk covering.

DETAILED DESCRIPTION

Figure 1:
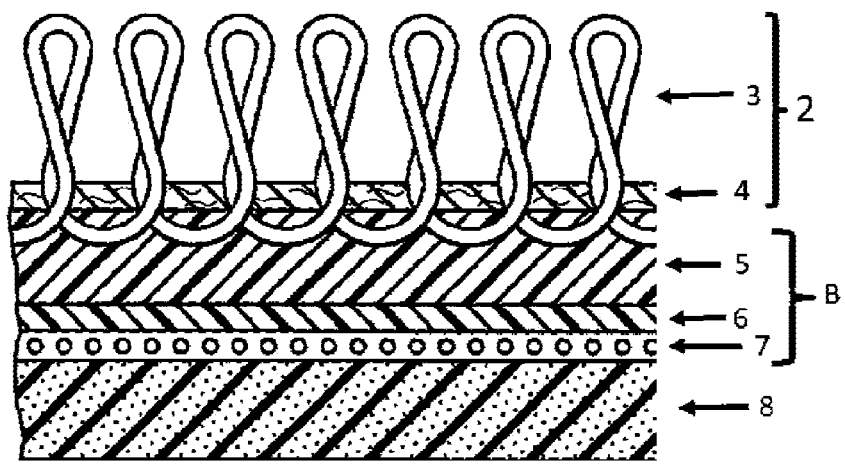
FIG. 1 is a cross-section view showing the carpet system of the prior art.

FIG. 1 shows an automotive carpet system according to the state of the art with following consecutive layers (the layers are not drawn in real thickness relation to each other):

The visible surface of carpet formed by a pile 2. The pile might be a tufted pile 3, consisting of yarn tufts in loop and/or cut configuration. The yarn is tufted in a fabric called the primary backing layer 4. The pile can also be a needle punch type face layer, whereby due to variable needling steps, for instance alternating steps with fork and crown needles a tufted pile appearance is mimicked. (not shown)

A back coating or precoat 5 is applied to the surface opposite the pile. The function of the back coating is the binding of the fibers or filaments within the construction and/or, in case of tufted pile, the binding of the tufts to the primary backing. The back coating prevents the pull out of single fibers, filaments, and/or full tufts. In most cases, a latex coating is used as back coating layer preparing the surface and enabling a good lamination to the following layer. The latex coating is meant to penetrate the lower area of the pile and eventually the primary backing layer, to get this effect a frothed or foamed latex is applied to the back. This effects in a not full coverage of the surface by the latex and/or an uneven coated layer. Latex is unwanted for environmental reasons including recycling of waste and end-of-life products containing latex.

A further back coating layer 6, also known as secondary backing layer, is used to enhance the stiffness and durability of the pile layer. It in particular enhances the abrasion performance of the pile.

The thus formed carpet system might be placed on top or is laminated to an insulating mass spring system with a mass layer (also called heavy layer or barrier) 7 normally formed of an extruded blank of highly filled thermoplastic material and a soft decoupling layer 8 made of either a foam or a felt material.

Surprisingly, the bonding mass layer according to the invention is able to replace the backing layers (B) formed by the back coating 5, the secondary backing layer 6, and the barrier layer 7 of a classical system according to FIG. 1 while maintaining the functions of these layers.

Figure 2:
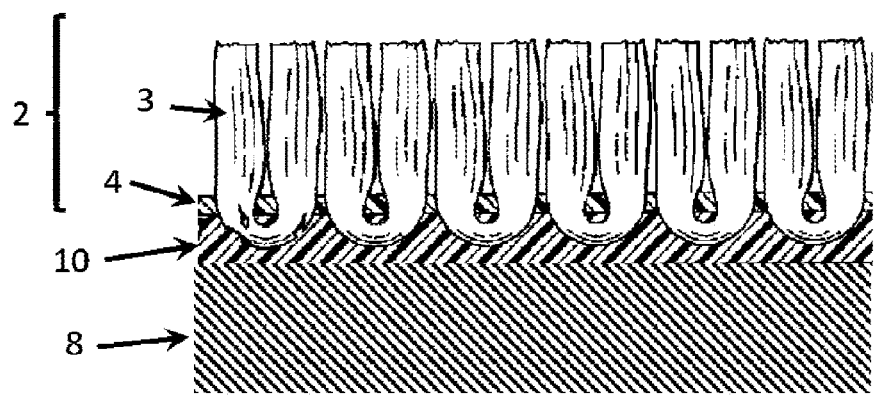
FIG. 2 is a cross-section view showing the noise attenuating trim part of one embodiment of the present invention.
Figure 3:
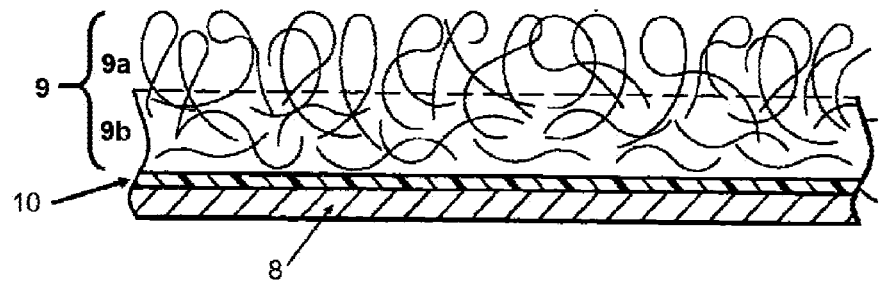
FIG. 3 is a cross-section view showing the noise attenuating trim part of one embodiment of the present invention.

FIGS. 2 and 3 show noise attenuating trim parts with a layout according to the invention.

FIG. 2 shows a basic construction according to the invention with a pile 2 formed by a tufted yarn 3 tufted in a primary backing 4.

FIG. 3 shows a basic construction according to the invention with a needle punch carpet layer 9 whereby the reciprocal action of fork and or crown needles a carpet surface layer is produced from a mat of fibers with a densified area 9b and a looser top area mimicking a tufted pile appearance and hand 9a.

In both pile carpet systems according to the invention, the precoat 5, secondary backing layer 6, and the barrier layer 7 of the state of the art as shown in FIG. 1 are replaced by one single layer, the bonding mass layer 10. This layer is surprisingly able to bond the fibers or filaments as well as the tufts and the primary backing in the tufted pile, or to bond the fibers in the needle punch pile layer, to enhance the stiffness of the carpet structure and to function as a barrier layer depending on its weight being above roughly 400 g/m².

With the bonding mass layer 10 according to the invention, a multipurpose layer was created that is able to replace three layers, simplifying the carpet construction of the state of the art and reducing the production process steps accordingly. Saving materials and resources.

Figure 4:
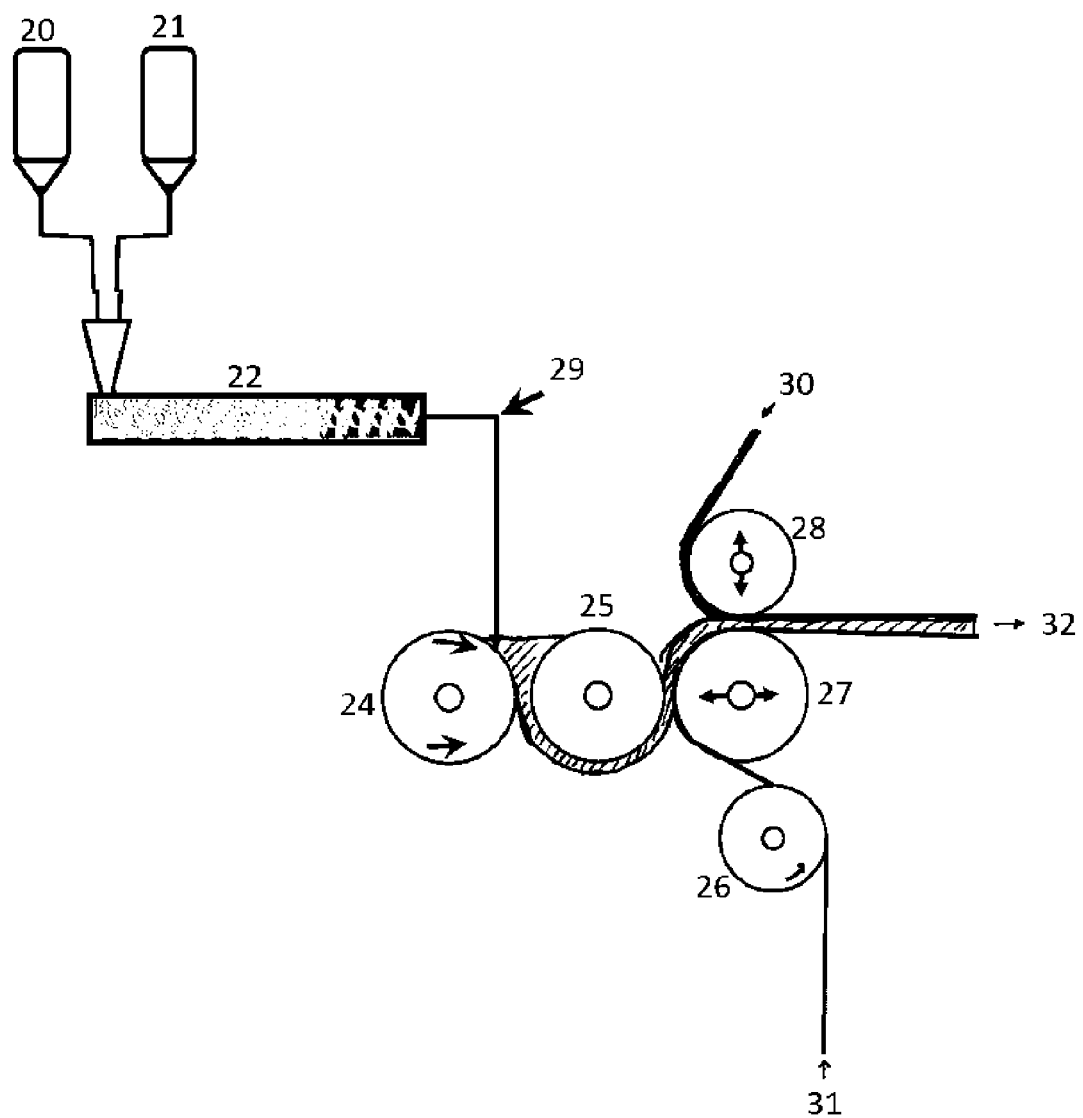
FIG. 4 shows a production process of one embodiment of the present invention.

FIG. 4 shows a preferred production process for the pile carpet system according to the invention. Via one or two hoppers 20, 21 the thermoplastic polyolefin based resins, filler, and additives can be dosed to a single screw extruder 22. The material is compounded, heated, and melted to the preferred temperature for application.

The thus prepared material 29 is dosed between a dosing roller 24 and an application roller 25. The dosing roller enables an even spread layer of the bonding mass material picked up by the application roller.

A first roller 26 transports a pile layer to the counter pressure roller 27, that presses the back surface of the pile layer 2 against the application roller 25 carrying the bonding material, thereby transferring the bonding mass material to the surface of the pile layer creating a light penetration of the bonding carrier material into the pile layer. Surprisingly it is possible to create good lamination with the highly filled bonding material as well as a good even layer. Surprisingly this simple application system is able to transfer up to at least 980 g/m², of the high filled low viscosity bonding mass material according to the invention.

Surprisingly the solidified layer does not crumble or lose its flexibility after the molding of the product in a later step. Furthermore, an intended layer does not migrate during the molding step such that layer would become impaired.

A second laminating roller 28 transports the backing layer 30 to the counter pressure roller 27 after the application of the bonding material to the carrier backing. The backing layer 8, such as a decoupling layer 8, is pressed against the surface of the bonding mass layer to form a sandwich of all three materials 32. Depending on the final layout of the product, the backing layer can be a film or a scrim to enable back foaming of the part in a next step or it might be a felt layer, eventually consolidated or a slab foam layer.

The thus formed material might be stored on rolls or cut into blanks. Independent of the backing layer chosen, the material can be formed in thermal conversion process using cold or hot molding eventually with a preheating step.

Surprisingly, it is possible to pick up the high filled carrier backing with the application roller and to transfer the material as an even layer to the fibrous layer with a final thickness within acceptable tolerances and without major flaws of the surface like folds or stretch marks.

In case the backing layer is felt material, the material might be molded to fit the contours of the specific floor pan of the car eventually trimming the borders and eventually through holes for appliances, forming the final vehicle floor part. FIG. 4 gives an example of such a molded structure.

In case of a foam backing layer, the same molding step as for felt may be used to pre-form the pile layer structure and a second molding step is used to back foam against the back surface of the backing layer to form the decoupler. The backing layer can be a light scrim layer or a compatible film layer either single layer or multilayer.

Surprisingly the bonding mass material according to the invention is able to be transferred by a simple application or coating process. However, after solidifying the layer is stiff enough to form a good acoustic insulating barrier layer, while at the same time it is flexible enough to be molded and to maintain its barrier properties after molding into the final part.

With this bonding mass material and the preferred process, it is now possible to make an economic carpet construction with less steps and the same acoustic and stiffness requirements.

In case the backing layer is felt material, the material might be molded to fit the contours of the specific floor pan of the car eventually trimming the borders and eventually through holes for appliances, forming the final vehicle floor part.

In case the backing layer is foam, the same molding step as for felt may be used to pre-form the pile layer structure and a second molding step is used to back foam against the back surface of the backing layer to form the decoupler 8. The backing layer can be a light scrim layer or a compatible film layer either single layer or multilayer.

Surprisingly the bonding barrier material according to the invention is able to be transferred by a simple application or coating process. However, after solidifying the layer is stiff enough to form a good acoustic insulating barrier layer, while at the same time it is flexible enough to be molded and to maintain its barrier properties after molding into the final part.

With this bonding barrier material and the preferred process, it is now possible to make an economic carpet construction with less steps and the same acoustic and stiffness requirements.

The invention claimed is:

1. A noise attenuating trim part for a vehicle, comprising:
   a pile layer;
   a backing layer;
   a bonding mass layer is bonded to the pile layer and the backing layer;
   wherein the bonding mass layer comprises at least one thermoplastic elastomeric polyolefin based compound material (TPO) with a filler content of at least 55% by weight of the overall bonding mass layer;
   wherein the bonding mass layer has a density of between 1.4 and 1.75 kg/dm$^3$, a viscosity of less than 50,000 mPa·s;
   wherein the bonding mass layer is adjacent to the pile layer and partly penetrated into a lower area of the pile layer, thereby binding fibers, filaments, yarn, and/or tufts of the pile layer; and
   wherein the TPO consists of a first component consisting of at least one of a partially amorphous polyolefin, and a second component consisting of a PP-Ethylene with a random ethylene repeat distribution having a specific density of less than 0.87 kg/dm3.

2. The noise attenuating trim part according to claim 1, whereby the first component is at least 3% by weight of the bonding mass layer and the second component is at least 7% by weight of the bonding mass layer.

3. The noise attenuating trim part according to claim 2, wherein the first and second component together are 10-48% by weight of the bonding mass layer.

4. The noise attenuating trim part for a vehicle according to claim 1, characterized in that the bonding mass layer further comprises at least one fatty acid and optional additives, and whereby the filler is between 55 and 70% by weight of the bonding mass layer, and a fatty acid content of the fatty acid is between 0.2 and 0.8% by weight of the bonding mass layer.

5. The noise attenuating trim part for a vehicle according to claim 1, whereby the bonding mass layer has an area weight of between 100 and 980 g/m$^2$.

6. The noise attenuating trim part according to claim 4, whereby the fatty acid comprises at least fatty acids with an aliphatic chain of at least 14.

7. The noise attenuating trim part according to claim 1, whereby the bonding mass layer comprises a constant area weight over the surface of the noise attenuating trim part.

8. The noise attenuating trim part according to claim 1, whereby the pile layer has an area weight of between 400 and 2000 g/m$^2$.

9. The noise attenuating trim part according to claim 1, whereby the pile layer is one of a tufted carpet layer consisting of BCF yarn tufted into a primary backing layer, or a needle punch carpet layer with a densified sole area and a surface area formed of looped fibers standing substantially perpendicular to the surface comprising of a least one of solid fibers, hollow fibers, binder fibers or bicomponent fibers.

10. The noise attenuating trim part according to claim 1, wherein fibers, filaments, and/or yarn of the pile layer are made of at least one polymer or co-polymer from a group consisting of group of polyester, polyamides, polyolefins, polyethylene (PE), or mixtures from two or more thereof.

11. The noise attenuating trim part according to claim 1, wherein the backing layer is at least one of a fibrous layer, a foam layer, or in mold reactive foam layer.

12. The noise attenuating trim part according to claim 1, further comprising at least partially at least one additional layer or patch between the bonding mass layer and a decoupling layer comprising a high density thermoplastic elastomeric layer, a film layer, or an air flow resistive fibrous layer, the air flow resistive fibrous layer having an air flow resistance of at least 1000 Rayls.

13. The noise attenuating trim part according to claim 12, whereby the high density thermoplastic elastomeric layer is impervious and has area weight between 800 and 2000 g/m$^2$.

14. An automotive flooring, inner dash, outer dash, acoustic trim panel, or trunk covering comprising the noise attenuating trim part of claim 1.

* * * * *